A. KENDALL.
Combined Governors and Cut-Offs.

No. 148,304. Patented March 10, 1874.

Witnesses.

Inventor.
A. Kendall.
Per Burridge & Co.
Attys.

A. KENDALL.
Combined Governors and Cut-Offs.

No. 148,304.  Patented March 10, 1874.

Witnesses.  Inventor.

5 Sheets--Sheet 5.

A. KENDALL.
Combined Governors and Cut-Offs.

No. 148,304. Patented March 10, 1874.

Witnesses.
D. Douglas
A. F. Cornell.

Inventor.
A. Kendall.
Per Burridge & Co.
Attys.

UNITED STATES PATENT OFFICE.

ADONIRAM KENDALL, OF CLEVELAND, OHIO.

IMPROVEMENT IN COMBINED GOVERNORS AND CUT-OFFS.

Specification forming part of Letters Patent No. 148,304, dated March 10, 1874; application filed January 10, 1874.

*To all whom it may concern:*

Be it known that I, ADONIRAM KENDALL, of Cleveland, in the county of Cuyahoga and State of Ohio, have invented a certain new and Improved Automatic Steam Cut-Off and Governor Combined; and I do hereby declare that the following is a full, clear, and complete description thereof, reference being had to the accompanying drawings, making part of the same.

Figure 1:
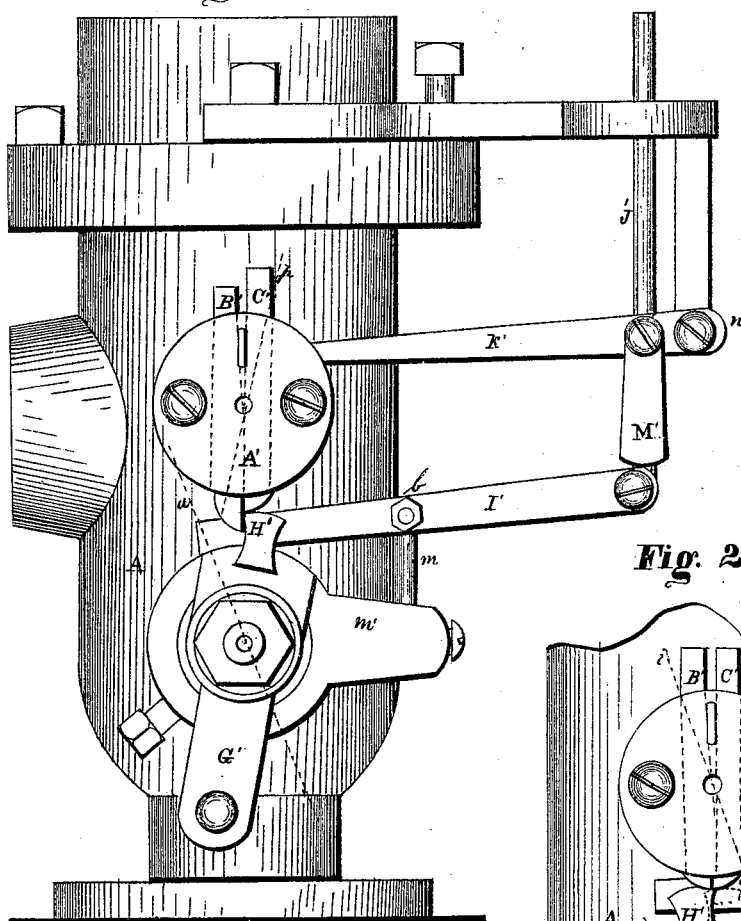
Figure 2:
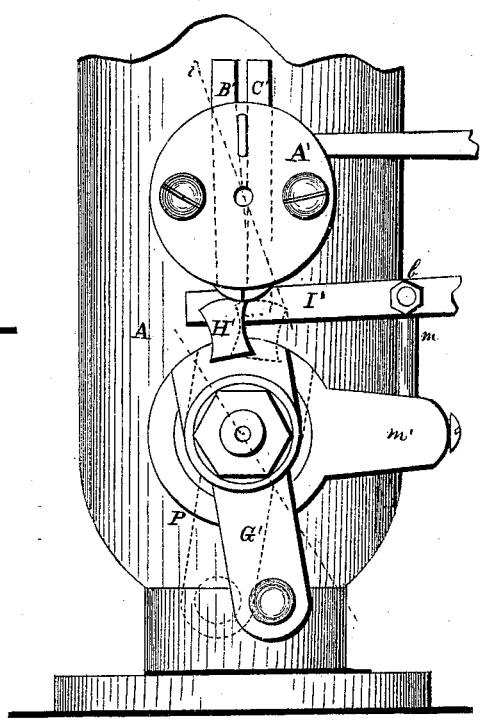
Figure 3:
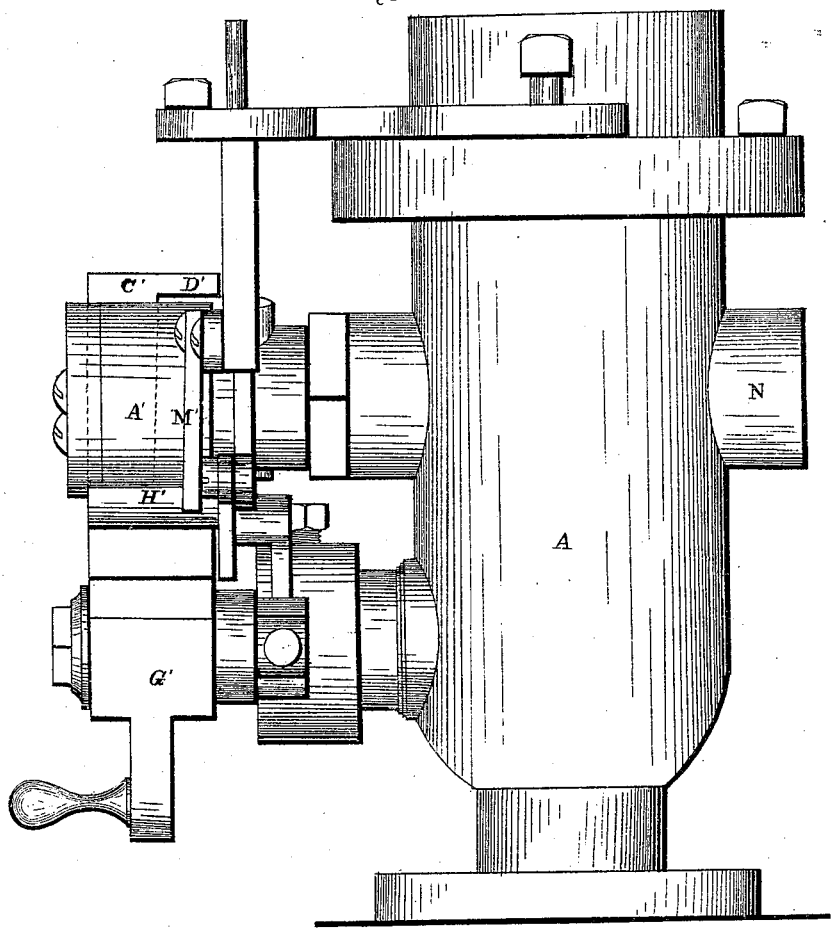
Figure 4:
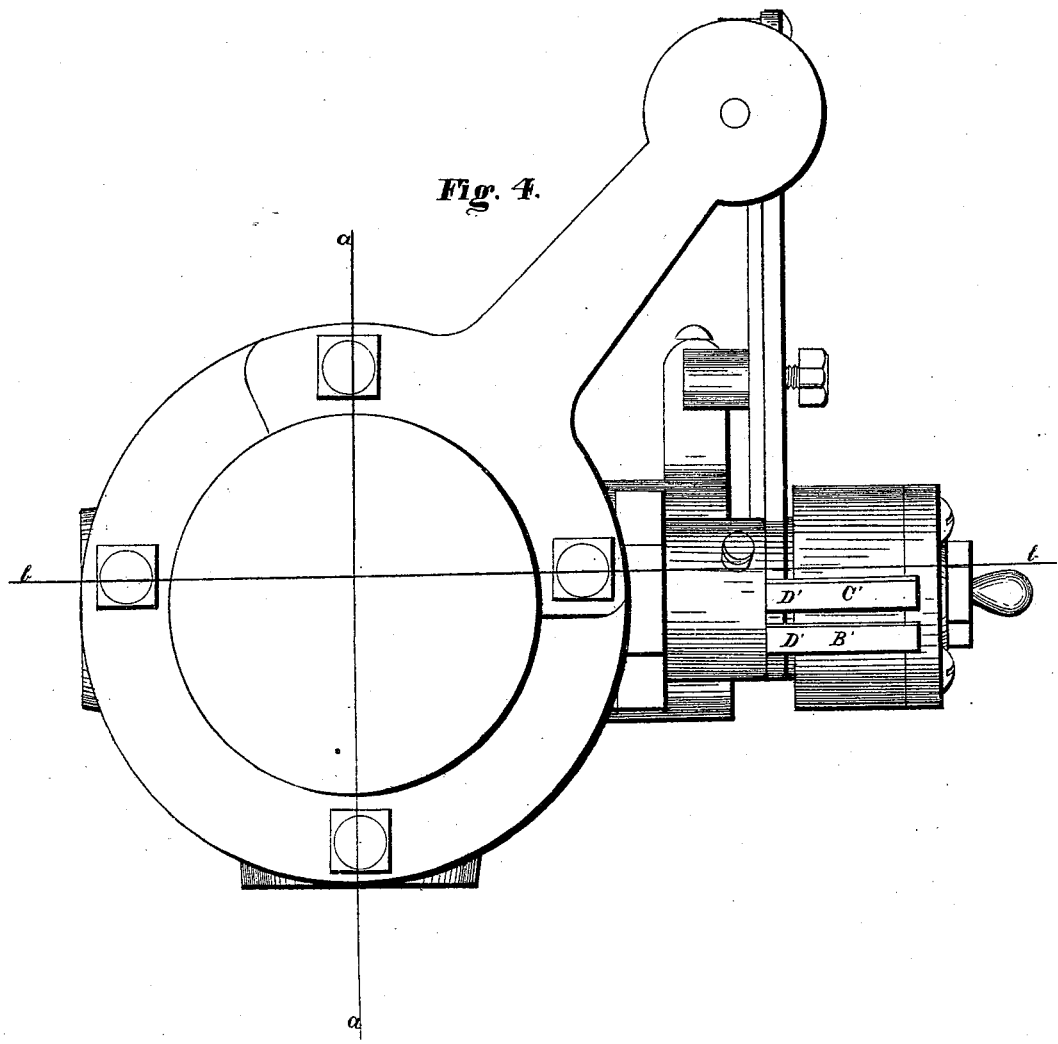
Figure 5:
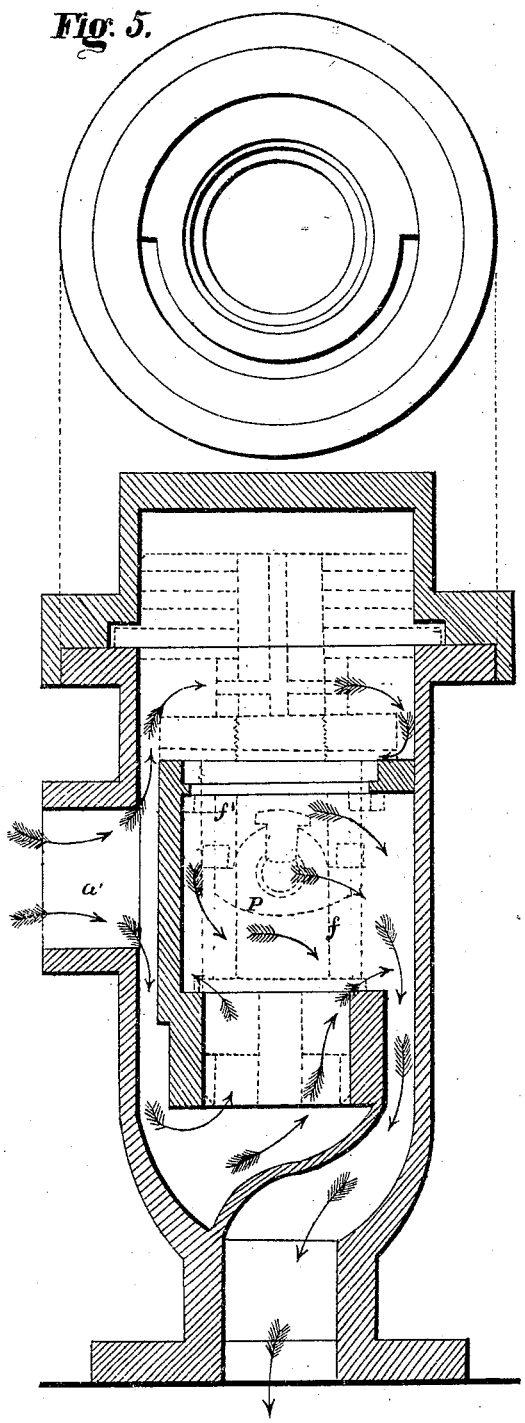
Figure 6:
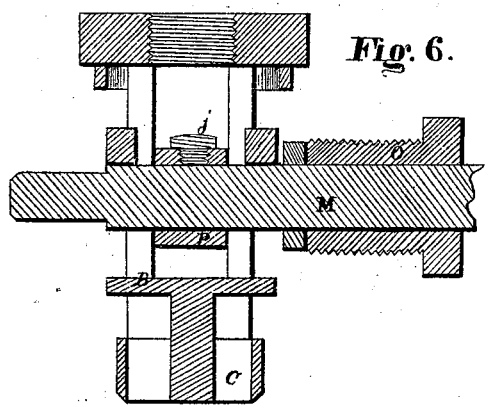
Figure 7:
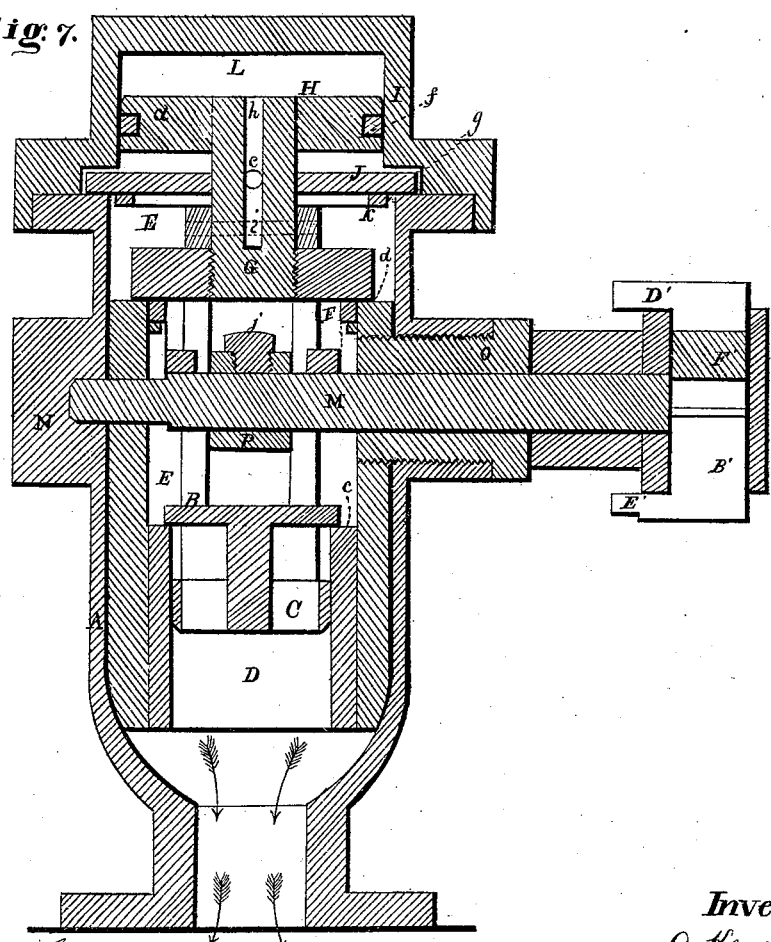

Figures 1, 2, and 3 are side views of the valve. Fig. 4 is a top view. Fig. 5 is a transverse vertical section in direction of the line *a a*, Fig. 4. Fig. 6 is a transverse vertical section of the valve detached. Fig. 7 is a transverse vertical section in direction of the line *b b*, Fig. 4.

Like letters of reference refer to like parts in the several views.

The nature of this invention relates to a governor-valve for steam-engines, and the mechanism for operating the same, and the object thereof is to produce a valve sensitive to a variable head of steam, and which at the same time shall be a balanced valve, or a valve having a pressure of steam equal on every side, and which mechanism referred to automatically under certain circumstances closes the valve, thereby shutting off steam, and thus preventing injury to the engine, or to the works driven thereby. Of said invention the following is a more full and complete description.

In the drawing, Fig. 1, A represents a shell or chamber in which the valve B, Fig. 7, is arranged, and has its bearings or seats. A vertical transverse section of said valve is shown in Fig. 6. The shoulder *c* is the seat of the lower end of the valve, and *d* is the seat of the upper end. Said valve is an open one, and the lower end C fits closely, but not tightly, in the part D of the shell, as shown in Fig. 7. It will be observed that the steam-space E, Fig. 7, is of larger diameter than the part D; hence the upper end of the valve has a larger surface presented to the action of the steam than the lower end, therefore the valve in this condition would not be equally balanced. In order to avoid this unequal steam-surface of the valve a ring, F, Fig. 7, is fitted in the upper end of the steam-space E, thereby reducing its diameter to that of the part D, thus making the upper and lower surface of the valve present an equal surface to the steam-space E. In the upper end of the valve is screwed a stem, G, to which is secured a head or piston, H. Said head is fitted closely, but not tightly, in the cap I of the shell, which head is made steam-tight therein by a ring-packing, *f*, as shown in the drawing, Fig. 7. J is a collar or disk through which the stem G slides. On the under side of said collar projects a ring, K, which is made to fit loosely in the inside of the rim of the shell, whereas the collar projects over onto the rim, and rests thereon, as shown. Between the edge of the collar and the side of the cap I (fitting down over the head and collar) is a narrow space, *g*, the purpose of which will presently be shown. The collar J referred to serves as a diaphragm or partition, whereby the steam-chamber E is divided from the space L, above the head H, but communication is had between the two by means of a small hole, *h*, bored in the end of the stem, and which extends down therein below the partition J. The lower end of the bore is intersected by a small hole, indicated by the dotted lines *i*, which opens into the steam-chamber, and through which the steam passes from the chamber E into the bore *h*; thence into the space L above the head, and under it through the transverse hole *e*, for a purpose hereinafter shown.

The above-described valve is operated by the following devices: M, Fig. 7, is a stem projected transversely through the steam chamber and valve. The inner end of the stem has its bearings in the side of the shell in a boss, N, whereas the outer end is supported in a stuffing-box, O, constructed in the usual way. P is the valve-lifter, and is fastened to the valve-stem by a set-screw, *j*, an end view of which and the valve is indicated by the dotted line in Fig. 5. To the outer end of the valve-stem is secured a head, A', Figs. 1 and 3. In said head is loosely fitted, so as to work freely therein, two slides, B' C', each having an inward-projecting finger, D' E', above and below, as shown in Fig. 7. The upper ends of the slides are separated from each other by a dividing-plate, F'. Immediately below said head and slides is pivoted a lever, G', Figs. 1 and 3. To the upper end of said lever is secured a bill, H′, whereby the slides B′ C′ are operated, as hereinafter described. I′, Figs. 1 and 2, is a lever pivoted at $b$ to the standard $m$. One end of said lever extends to and under the fingers of the slides, whereas to the opposite end is attached the governor-rod J′. K′ is also a lever pivoted at $n$, the free end of which reaches to and under the fingers D′ of the slides, as shown in Fig. 4. From the pivoted end of the lever depends a drop, M′, Fig. 1, the purpose of which will presently be shown.

The practical operation of the above-described cut-off valve is as follows: The apparatus is secured to the top of the steam-chest in the position shown in the drawings. To the lever G′ is attached the eccentric-rod, and to the rod J′ the governor. On the movement of the engine a vibratory motion is imparted to the lever G′ by means of the eccentric referred to, the result of which will be to vibrate the bill H′ immediately under the slides. The position of the slides B′ C′ and the lever G′, as shown in Fig. 1, is such as when the valve is closed.

It will be observed that the slide B′ has dropped below the face of the bill, and is, therefore, close to one side thereof, whereas the slide C′ rests upon the bill. Now, as the lever is moved from the position shown in Fig. 1 to that indicated by the dotted line $a$, and shown in Fig. 2, the bill H′ will push against the slide B′ and turn the head A′ to the position indicated by the line $p$. This turning of the head also turns the valve-stem M, Fig. 7, thereby lifting the valve by one wing of the valve-lifter P, Fig. 7—also indicated by the dotted lines in Fig. 5—and thus allow steam to pass through the valve into the steam-chest. In consequence of the vibratory movement of the bill, a disengagement of the end of the slide B′ therewith takes place about the instant that the bill reaches said line $p$, Fig. 1. The head and slides will then immediately (in consequence of the weight of the valve) assume the closed position, as shown in Figs. 1 and 2, thereby shutting off steam. The ends of the slides slip back over the face of the bill, and before the reaction of the lever the slide C drops on the opposite side of the bill. Now, by the reverse movement of the lever G′, the bill pushes against the slide C′ and turns the head A′ and valve-stem in the opposite direction from that above first described, thereby opening the valve by means of the opposite wing of the lifter P.

When the head, &c., have been so far turned as the position indicated by the line $i$, Fig. 2, a disengagement of the slide with the bill takes place, as in the above instance, which allows the valve to close by the two ends of the slides slipping back on the face of the bill, and when the bill reaches the position shown in Fig. 1 it will permit the slide B′ to drop again to the side thereof, as shown. When by the again reverse movement of the lever, the bill pushes against the slide B′, and thereby opens the valve, as abovesaid, and by the means specified, and so on, so long as the lever continues to vibrate, the valve is alternately opened and closed—opened by the bill actuating the head and valve-stem by contact with the slides, and closed when released therefrom by its own weight.

The amount of steam admitted to the cylinder will be in proportion to the opening or throw of the valve, which throw of the valve is governed by the lever I′, to which the governor is attached by means of the rod J′. When an excess of steam causes an increased movement of the engine beyond its ordinary working motion, a portion of the steam is cut off by the action of the governor on the lever I′. Thus, the governor, as the balls drop, depresses the outer or pivoted end of the lever, thereby raising the inner end under the slides, the effect of which is to lift them up, so that neither of them can drop so far down by the side of the bill as when the lever is not lifted on a slow movement of the engine, hence their engagement therewith will not be so long continued. The slides will slip from the end of the bill at a less vibration of the lever G′, the result of which is a less vibratory movement of the head A′, and, therefore, as a consequence a shorter throw or opening of the valve attended by a less admission of steam into the cylinder, which will result in a corresponding decrease in the movement of the engine, and which will be, more or less, according to the distance that the lever I′ may lift the slides by the movement of the governor, which, in the event it is of unusual speed, the lever will so far lift the slides as to prevent them from engaging the bill at all, but will slide backward and forward thereon above the bill, while the speed of the engine is arrested for the want of steam, as the valve is, in this condition of the slides, inoperative.

In the event that any accident should occur to the governor so that it could not actuate the lever I′ for regulating the vibration of the head A′, &c., and therefore a full head of steam be admitted into the cylinder in consequence of a full open valve, the valve in such an event is closed by means of the lever K′, which, when the lever I′ is in the condition to allow an extraordinary vibration of the head A′ in consequence of the great depression of its inner end, or that under the slides, the outer end of said lever I′ will push upward the lever K′ by means of the drop M′ depending therefrom, while its lower end is pushed upon by the lever I′. This upward movement of the lever K′ will lift the slides by the fingers D′, under which the free end of the lever projects, and thereby prevent said slides from becoming engaged by the bill, which, as a consequence will arrest the motion of the valve and stop the engine. The ordinary working of the engine and the play of the governor do not so far effect the movement of the lever I′ as to cause it to push upward the lever K′, for the length of the drop M′ is too short to be reached by the end of the lever in its ordinary working position. The lever K' is introduced as a precautionary measure to guard against accident to the engine in the event anything should happen to the governor to cause an unusual play of the valve. The course of the steam into and through the chamber A and valve will be understood by referring to Figs. 5 and 7.

As abovesaid, the apparatus is placed on the steam-chest of the engine, in the position shown in said Figs. 5 and 7. Steam is admitted at a', Fig. 5, from which it passes into and through the openings of the valve, the valve being represented by the dotted lines f', and the induction of the steam into the chamber, and its eduction therefrom, by the arrows. The valve on being raised by the above-described devices, the steam passes at once under the heads or ends thereof when raised from the seats and passes through the valve and out of the lower end, as shown by the arrows.

It will be obvious that the valve is entirely surrounded by steam; hence the pressure is nearly, if not quite, equal on all of its sides, so that it requires but little force to raise it for the admission of steam through it into the cylinder, the valve being closed mainly by its own gravity.

In order to ease the fall of the valve upon its seats, and also to prevent it from making a noise, it is cushioned up by the admission of steam under the piston or head H, Fig. 7. Said piston is secured to the upper end of the valve by the screw or stem G. Steam is admitted between said piston and the disk or collar J through the small hole $i$ and the transverse hole $c$ referred to, and also above the head through the hole $h$, as aforesaid. Thus the valve being lifted, so also will be the head H.

This upward movement of the head will carry the transverse hole $c$ above the collar, thereby allowing a small amount of steam to pass into the space between the head and collar, so that on the descent of the valve the head will be cushioned up by the steam between it and the collar, and thereby prevent the valve from falling with much force upon its seats, and thus prevent noise and undue wearing of the valve and seats. The steam between the head and collar finds no immediate escape through the hole, for said hole, on the descent of the head and valve, is again covered by the collar, as shown in the drawing, Fig. 7.

The standard $m$, Figs. 1 and 2, is adjustable in the arm $m'$, so that it can be raised or lowered for the purpose of adjusting the position of the lever I' in its relation to the slides B' C', for regulating their engagement with the bill H' for controlling the throw of the valve.

What I claim as my invention, and desire to secure by Letters Patent, is—

1. The dividing-plate F', in combination with the slides B' C', in the manner as and for the purpose specified.

2. The lever K' and drop M', as arranged, in combination with the lever I' and slides B' C', substantially in the manner as and for the purpose set forth.

3. The ring F, as arranged in relation to the valve B and valve-chamber A, for equalizing the steam upon the valve, in the manner as described and set forth.

4. The adjustable standards $m\ m'$ on lever I', in combination with the slides B' C', substantially as and for the purpose set forth.

ADONIRAM KENDALL.

Witnesses:
    W. H. BURRIDGE,
    J. H. BURRIDGE.